(12) United States Patent
Petersson et al.

(10) Patent No.: US 12,380,293 B2
(45) Date of Patent: Aug. 5, 2025

(54) METHOD FOR ASSEMBLING WIRELESS IDENTIFICATION TAGS IN CONCRETE PROCESSING TOOLS

(71) Applicant: HUSQVARNA AB, Huskvarna (SE)

(72) Inventors: Ulf Petersson, Tollered (SE); Robert Nyström, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 121 days.

(21) Appl. No.: 18/267,500

(22) PCT Filed: Dec. 13, 2021

(86) PCT No.: PCT/SE2021/051236
§ 371 (c)(1),
(2) Date: Jun. 15, 2023

(87) PCT Pub. No.: WO2022/131997
PCT Pub. Date: Jun. 23, 2022

(65) Prior Publication Data
US 2024/0311593 A1   Sep. 19, 2024

(30) Foreign Application Priority Data
Dec. 18, 2020   (SE) .................................. 2051497-2

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .................. G06K 7/10366; G06K 19/0723

USPC .......................................................... 235/451
See application file for complete search history.

(56) References Cited

U.S. PATENT DOCUMENTS

| | | | |
|---|---|---|---|
| 2005/0248459 A1 | 11/2005 | Bonalle et al. | |
| 2014/0003751 A1 | 1/2014 | Ito | |
| 2014/0124582 A1 | 5/2014 | Kroener et al. | |

FOREIGN PATENT DOCUMENTS

| | | |
|---|---|---|
| CN | 210377516 U | 4/2020 |
| EP | 1243946 A2 | 9/2002 |
| EP | 2460623 A2 | 6/2012 |
| EP | 2657889 A2 | 10/2013 |
| EP | 2813324 A1 | 12/2014 |

(Continued)

OTHER PUBLICATIONS

International Search Report and Written Opinion for International Application No. PCT/SE2021/051236 mailed Jan. 18, 2022.

(Continued)

*Primary Examiner* — Daniel A Hess
(74) *Attorney, Agent, or Firm* — Burr & Forman LLP

(57) ABSTRACT

A wireless identification tag (110) for embedding into a surface (101) of a concrete processing work tool (102), the wireless identification tag comprising processing circuitry arranged on a carrier member for wireless communication with a corresponding reader (120, 150, 170), wherein the carrier member is arranged at least partially embedded into an enclosing material (M) having a Shore A hardness between 40 and 100, wherein one or more positioning elements are arranged extending out from the carrier member to position the carrier member in the enclosing material.

17 Claims, 3 Drawing Sheets

(56) References Cited

FOREIGN PATENT DOCUMENTS

| | | |
|---|---|---|
| JP | 2016173765 A | 9/2016 |
| KR | 100913215 B1 | 8/2009 |

OTHER PUBLICATIONS

Swedish Office Action and Search Report for Swedish Application No. 2051497-2, Mailed on Aug. 10, 2021.

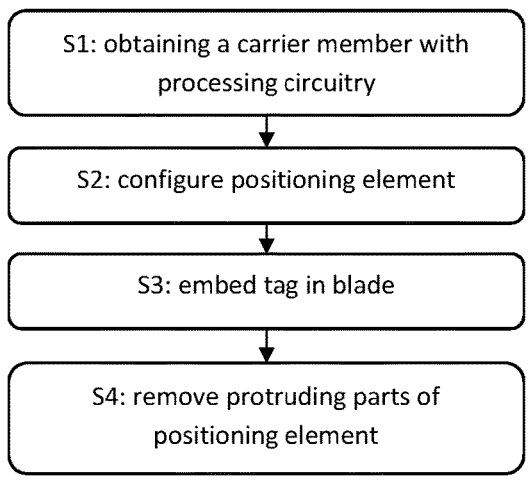
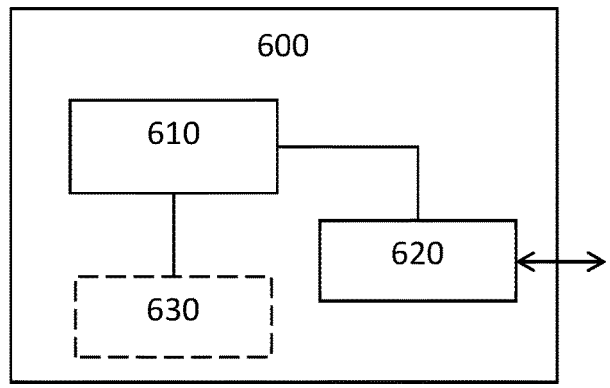
FIG. 5
FIG. 6
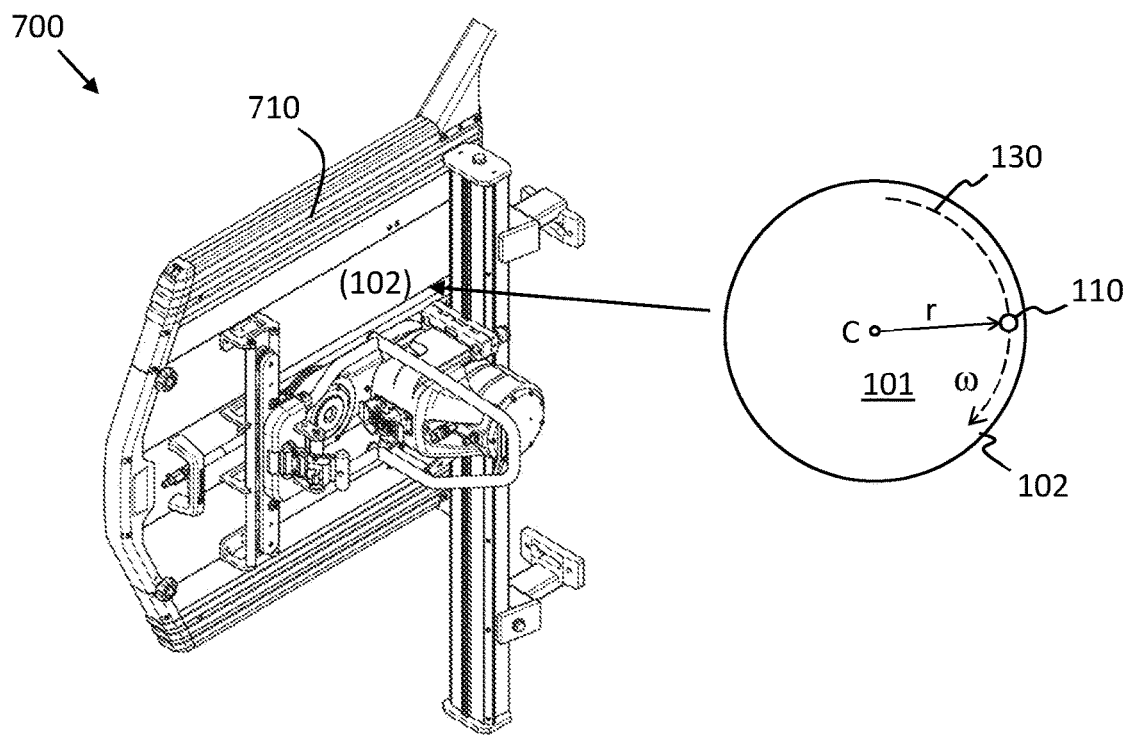
FIG. 7

METHOD FOR ASSEMBLING WIRELESS IDENTIFICATION TAGS IN CONCRETE PROCESSING TOOLS

TECHNICAL FIELD

The present disclosure relates to wireless identification tags embedded into concrete processing tools such as abrasive cutting discs arranged for cutting hard materials like concrete and stone.

BACKGROUND

Radio-frequency identification (RFID) technology uses electromagnetic fields to automatically identify and track tags attached to objects. The tags often contain electronically stored information such as an identification number. While active tags have a local power source (such as a battery) and may operate hundreds of meters from the RFID reader, passive tags collect energy from a nearby RFID reader's interrogating electromagnetic field and therefore has a reduced range. RFID tags are used in many industries. For example, an RFID tag attached to a work tool such as a cut-off disc can be used to identify the type of disc attached to the tool. EP 2 460 623 A2 discloses an example use of RFID technology with rotatable work tools.

Embedding wireless identification tags into metallic objects, such as a cut-off disc, is desired since the tag is well protected when embedded into the tool, but also problematic since the high electrical conductivity of the metal surrounding the hole in which the tag is placed generates opposing magnetic flux that cancels out the magnetic flux through the hole. This effect, described by the Maxwell-Faraday equation, complicates interacting with the tag by a reader.

Use of RFID tags with construction equipment such as cut-off tools is also made difficult due to the harsh operating environment. Thus, wireless tags which are tolerant to mechanical wear are desired.

EP1243946 A2 relates to electronic tags for use in harsh environments. The tags are embedded in a potting material.

KR100913215 B discusses manufacturing methods for producing RFID tags, which may be coated in polyurethane.

SUMMARY

It is an object of the present disclosure to provide wireless identification tags suitable for use with concrete processing tools such as cut-off tools, wall saws, and the like, and which mitigate at least some of the above-mentioned issues.

This object is at least in part obtained by a wireless identification tag for embedding into a surface of a work tool such as an abrasive cutting blade or saw blade. The wireless identification tag comprises processing circuitry arranged on a carrier member, such as a printed circuit board, for wireless communication with a corresponding reader. The carrier member is furthermore arranged embedded into an enclosing material having a Shore A hardness between 40 and 100, and preferably between 70-100. One or more positioning elements are arranged extending out from the carrier member to position the carrier member in the enclosing material.

Since the enclosing material is not hard and brittle but more resilient, it is more resistant against the blasting effect from the dust and slurry generated during concrete processing by abrasive action. Thus, the processing circuitry and other components of the wireless identification tag are better protected against harsh operating environments. A harder material, such as epoxy without softening additives, suffers from mechanical wear due to the blasting from the concrete dust and slurry during work tool use. The positioning elements simplify holding the carrier member in place while the enclosing material hardens, i.e., cures.

According to aspects, the enclosing material is an adhesive material arranged to form a bond between the wireless identification tag and the work tool to hold the wireless identification tag in position relative to the work tool.

This way the enclosing material acts as bond between work tool and carrier member, and at the same time protects the processing circuitry and other components from the outside environment. No additional glue or fastening members are required, which is an advantage.

According to aspects, the enclosing material is polyurethane. Polyurethane can be designed to obtain the required properties in terms of hardness and is at the same time robust to mechanical wear. Polyurethane is also reasonably watertight, and the carrier member can be lacquered for increased protection from moisture.

According to aspects, the enclosing material comprises rubber, such as natural rubber (NR) and/or Styrene-butadiene rubber (SBR). These materials also exhibit the required properties.

Other forms of embedding materials may also be used. Even hard and brittle materials if additives are used to generate the required properties. Thus, if the embedding material is too hard an additive can be added to make the embedding material more soft and resilient. An example of this type of additive is ethylene propylene diene monomer (EPDM) rubber.

According to aspects, the enclosing material comprises a chemically resistant material able to withstand submersion in a base of pH at least 12 for 60 minutes according to ISO 2812.

This is an advantage when processing concrete, since the concrete dust and/or slurry may be associated with pH levels in this range.

There is also disclosed herein work tools and construction equipment associated with the above-mentioned advantages.

The object is also obtained by a method for manufacturing a wireless identification tag. The method comprises obtaining a carrier member with processing circuitry, configuring one or more positioning elements to extend out from the carrier member, embedding the wireless identification tag comprising the carrier member and the one or more positioning elements into an enclosing material, and removing any protruding parts of the positioning elements extending out from the enclosing material.

By means of the positioning elements, the carrier member is held in position during curing/hardening of the material used for embedding the tag into an enclosing material such as polyurethane or the like. Thus, the carrier member does not float up or becomes spatially offset, which would risk exposing the carrier member and the wireless identification tag circuitry to the external harsh conditions.

Optionally, the wireless identification tag comprising the carrier member and the one or more positioning elements can be embedded into a molding by an enclosing material. This molding can then be attached to the work tool by a secondary adhesive or by fastening members such as a threaded element, i.e., a bolt or the like.

The positioning members may also be formed as part of a snap-lock mechanism. In this case a flexible protruding portion is arranged on the tag, which protrusion enters into locking position with a groove or the like formed in the work tool. The tag is then securely held in place as the embedding material hardens.

A threaded portion can also be formed in the work tool, which the carrier member can engage with in order to enter into a locking position.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where

FIG. 5 is a flow chart illustrating methods;

FIG. 6 shows an example circuit; and

FIG. 7 shows an example work tool.

DETAILED DESCRIPTION

Figure 1:
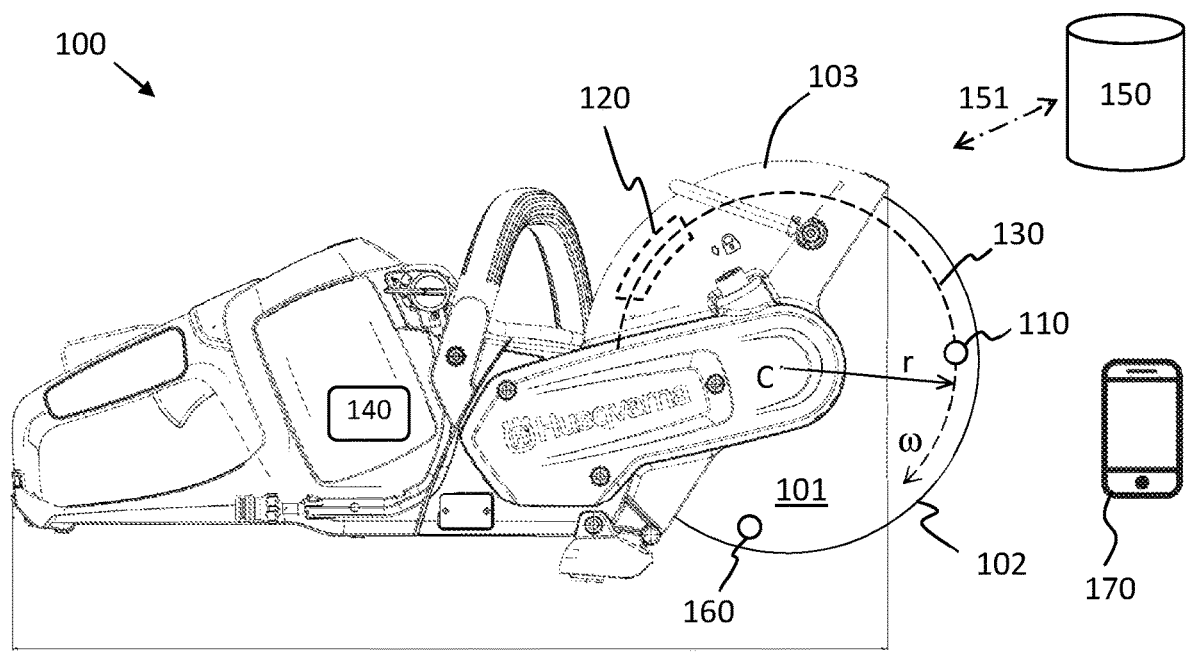
FIG. 1 shows an example work tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows hand-held construction equipment 100 for cutting hard materials such as concrete and stone by a work tool 102, here exemplified by a cut-off disc. The cut-off disc comprises cutting segments configured for abrasive operation.

FIG. 7 illustrates another example of construction equipment for processing concrete. This is a wall saw 700 for making straight cuts into concrete elements, e.g., for making openings for doors and windows in the concrete element. The wall saw also comprises a work tool 102, located behind the cover 710.

Both cut-off tools and wall saws are generally known and will therefore not be discussed in more detail herein.

The work tool 102 may be in the form of a blade, such as a diamond blade comprising cutting segments with diamonds arranged along a periphery of the blade. Carbide cutting segments are also known. It is appreciated that the techniques disclosed herein are not limited to abrasive cutting discs but can just as well be used with other metal saw blades.

With reference to FIG. 1, the tool 102 is made of metal, which means that its surface 101 is electrically conductive. The work tool 102 rotates in the direction indicated by the dashed line about a center of rotation C with rotational velocity $\omega$. The direction is shown as a 'down-cut' direction in FIG. 1, however, 'up-cut' operation where the work tool 102 rotates in the opposite direction is also possible.

With reference to FIGS. 1 and 7, the work tool 102 comprises a wireless identification tag 110 arranged embedded into the electrically conductive surface 101. The wireless identification tag 110 may be embedded in a circular hole cut in the surface 101. The circular hole may be a laser-cut hole extending through the work tool 102. Alternatively, the wireless identification tag may be embedded in a recess formed in the work tool, i.e., not a hole all the way though the work tool 102. This type of recess can be milled or otherwise machined into the surface.

The tag 110 is arranged at a radial distance r from a center of rotation C of the work tool, which means that it will move along a circular arc 130 with radius r when the work tool 102 is in use.

The tag 110 is preferably arranged at a radial distance r from the center of rotation C below two thirds of the radius of the work tool 102. For instance, if the radius of the work tool 102 is 17.5 cm, then the tag 110 should preferably be placed at a radial distance below 11 cm from the center C. According to aspects, the tag 110 is preferably arranged at a radial distance r above one third of the radius of the work tool 102. Placing the tag too close to the edge of the rotatable work tool may cause the tag to overheat. However, some measurements of, e.g., tool temperature are more accurate if obtained close to the edge. Preferably, the wireless identification tag 110 is arranged away from a blade tensioning zone. The extension of the blade tensioning zone varies between different tools.

With reference to FIG. 1, each revolution of the work tool 102, the wireless identification tag 110 passes a wireless identification tag reader 120 arranged on a blade guard 103, 710 of the construction equipment 100. The reader 120 is aligned with the tag 110 in the sense that it is arranged on the circular arc 130 at the same radial distance r from the center of rotation C as the tag, such that the tag passes more or less directly under the reader each revolution. The construction equipment discussed herein may be hand-held construction equipment or other types of construction equipment, including more heavy types of machinery such as floor saws, floor grinders, wall saws and the like.

FIG. 1 also shows a separate reader device 170 which may be in the form of, e.g., a smartphone, a tablet, or the like. The separate reader device 170 may be used to interface with the wireless identification tag 110 to, e.g., read out data from the tag or to write data onto a tag memory. The separate reader device 170 may also be used to configure the wireless identification tag 110.

Figure 2:
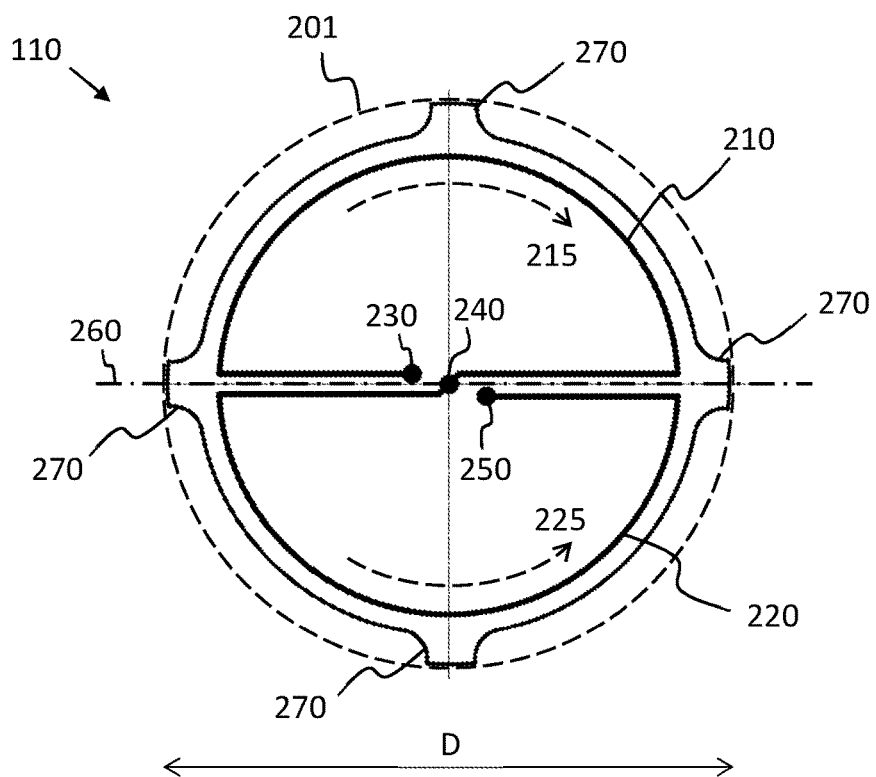
FIG. 2 schematically illustrates an example wireless identification tag.

According to an example, with reference to FIG. 2, a diameter D of the wireless identification tag 110 is between 10-20 mm, and preferably about 15 mm. The radial length of the reader 120 is between 50-100 mm, and preferably about 80 mm, corresponding to one radian at the mounted radial distance from the center C.

It has been realized that the concrete dust and slurry generated during cutting operation by a work tool such as the work tools 102 shown in FIGS. 1 and 6 generates significant mechanical wear on a circuit embedded into the tool surface 101, such as the wireless identification tag 110. This mechanical wear is akin to abrasive blasting, e.g., sand blasting, and wears down the material used to enclose the circuitry in the wireless identification tag. Once the circuit is laid open to the ambient environment, the mechanical wear easily damages the electrical components.

Normal epoxy resins and other hard glues used for attaching circuits and the like to carrier objects are too hard and brittle to be able to withstand the mechanical wear from dust and slurry during processing of concrete elements. The enclosing epoxy is worn down and the circuitry is then exposed to the external harsh conditions, which generally causes malfunction in the wireless identification tag. Such epoxy resins are normally associated with Shore D hardness values on the order of 80-90.

There are several scales of durometer or Shore hardness, used for materials with different properties. The two most common scales, using slightly different measurement systems, are the ASTM D2240 type A and type D scales. The A scale is for softer materials, while the D scale is for harder materials. However, the ASTM D2240-00 testing standard calls for a total of 12 scales, depending on the intended use: types A, B, C, D, DO, E, M, O, OO, OOO, OOO-S, and R. Each scale results in a value between 0 and 100, with higher values indicating a harder material.

A solution to this problem of mechanical wear on circuits and other objects embedded into work tools 102 for abrasive operation is presented herein which comprises using a softer material for embedding the tag into the metal surface. A softer more resilient material is not abraded by the dust and slurry generated during cutting concrete, at least not to the same extent as more brittle materials. Rather, particulate matter impinging on the embedded wireless tag instead bounces off the embedding surface. This way the mechanical wear is reduced, and the overall lifetime of the wireless identification tag is extended.

Toughness of a plastic can also be measured by its resistance to impacts. It is the ability of a material to resist both fracture and deformation. One common way to discuss the toughness of a polymer is to examine the area underneath the stress-strain curve for the particular polymer. In general, 'Hardness', 'Toughness' and 'Strength' are similar terms to use, but in material science they are three distinct properties yet also share some overlap. Hardness is how well material holds together when friction is applied. Strength is how much force is required before the material deforms. It tells us about the amount of load a material can bear. Toughness is the ability of a material to resist breaking when force is applied. Toughness is normally considered to be a combination of strength and ductility To be tough, a material must exhibit both fairly good strength and ductility to resist cracking and deformation under impact loading. Impact tests signifies toughness, or impact strength, of a material that is the ability of material to absorb energy during plastic deformation. This energy absorption is directly related to the brittleness of the material. Thus, it is appreciated that other measures than Shore A hardness may be relevant to determine suitability of a material to withstand an abrasive sand blasting effect.

The wireless identification tag 110 and the wireless identification tag reader 120 are comprised in a wireless identification tag system that enables functions such as identifying the type of work tool 102 attached to the construction equipment 100, and gathering data about tool use in the tag, which data can then be wirelessly accessed by the reader 120, and fed, e.g., to a control unit 140 in the construction equipment 100 or to a remote server 150. Several different applications where the wireless identification tag system 110, 120 can be used are enabled by the disclosed wireless identification tag systems disclosed herein. For instance, sensors such as inertial measurement units (IMU), temperature sensors, shock sensors, and vibration sensors can be arranged in connection to the wireless identification tag 110, and data from these sensors can be accessed via the reader 120.

According to some aspects, the control unit 140 is communicatively coupled to the remote server 150 via wireless link 151.

Some RFID technologies use electromagnetic induction between two loop antennas located within each other's near field, effectively forming an air-core transformer, for communication. Such systems often operate within the globally available and unlicensed radio frequency ISM band around 13.56 MHz. Theoretical working distance with compact standard antennas is up to 20 cm but the practical working distance is about 10 cm. In a passive mode of operation, an initiator device provides a carrier field, and a target device answers by modulating the existing field. In this mode, the target device may draw its operating power from the initiator-provided magnetic field, thus effectively making the target device a transponder. The target device corresponds here to the wireless identification tag 110 and the initiator device corresponds to the wireless identification tag reader 120.

The present system 110, 120 may operate according to this electromagnetic induction principle of communication, thus, as the tag 110 passes under the reader 120, the two come into range of each other for a short time duration. The tag is the first powered up, drawing energy from the reader via the inductive coupling, and then modulates the field in order to transfer information to the reader, such as an identification number or other data. This type of communication is known in general and will therefore not be discussed in more detail herein.

In physics, specifically electromagnetism, the magnetic flux through a surface is the surface integral of the normal component of the magnetic flux passing through that surface. The SI unit of magnetic flux is the weber (Wb), and the Centimetre-Gram-Second (CGS) unit is the Maxwell. Magnetic flux is usually measured with a known flux-meter, which contains measuring coils and electronics, that evaluates the change of voltage in the measuring coils to calculate the measurement of time varying magnetic flux.

FIG. 2 shows an example wireless identification tag 110 for embedding into an electrically conductive surface 101 of a rotatable work tool 102 such as the work tool shown in FIGS. 1 and 6. The tag comprises at least a first 210 and a second 220 inductive planar loop having respective first and second terminals 230, 240, 250. The inductive planar loops in the example of FIG. 2 are connected in series and therefore share a common terminal 240. Thus, according to aspects, a terminal like the terminal 240 may just be a continuing wire that extends from a planar loop into another planar loop without interruption. The first loop 210 is directed in a clockwise direction 215. The second loop 220 is instead directed in a counterclockwise direction 225, i.e., in an opposite direction compared to the first loop. Thus, by connecting the loops by the common terminal 240, the two loops become connected in series with respect to an induced voltage at the terminals of the loops.

The first inductive planar loop 210 and the second inductive planar loop 220 are arranged in relation to a common plane, e.g., parallel to the common plane. Notably, the first inductive planar loop 210 and the second inductive planar loop 220 are arranged to cover different areas of the common plane, where each area on the common plane is associated with a respective polarity of the magnetic flux normal to said plane. The plane referred to is here a plane defining a major extension of the flat wireless identification tag, which is coined shaped in this example. The different areas may, according to some aspects, be separate areas. However, the areas may also be partly overlapping, which can be the case, e.g., if the inductive planar loops are formed on separate layers of a carrier member such as a printed circuit board (PCB).

According to an example, a diameter D of the wireless identification tag 110 is between 10-20 mm, and preferably about 15 mm.

The wireless identification tag 110 optionally comprises protruding portions or positioning elements 270 configured to engage slots formed in the work tool, thereby aligning the tag 110 with respect to the work tool 102. The wireless identification tag shown in FIG. 2 is arranged to be embedded into the work tool 102 such that the separation line 260 forms a tangent to the circular arc 130. The protruding portions 270 simplify assembly of the work tool 102 and the tag 110.

The positioning elements 270 may also form part of a snap-lock mechanism which will be discussed in more detail below. Also, the positioning elements 270 may be arranged to engage a threaded portion on a tool and thus hold the tag in locking position with respect to the tool.

According to other aspects, the positioning elements 270 are configured as distance elements to space the tag 110 from the edge of the volume 201 formed in the work tool 102 to receive the tag 110. The distance elements then center the tag in the hole and allows for, e.g., an enclosing material M to fill the gap between tag and hole boundary. Other forms of distance elements will be discussed below in connection to FIG. 4A.

Figure 3A:
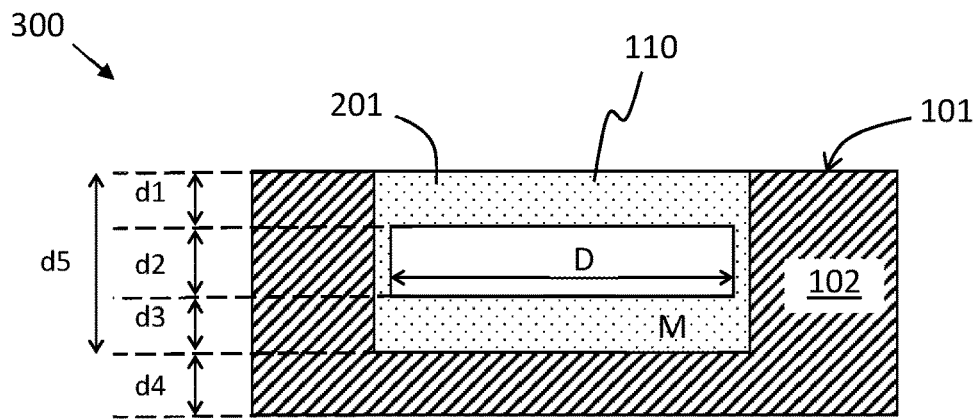
FIGS. 3A,B illustrate wireless identification tags embedded into work tools.
Figure 3B:
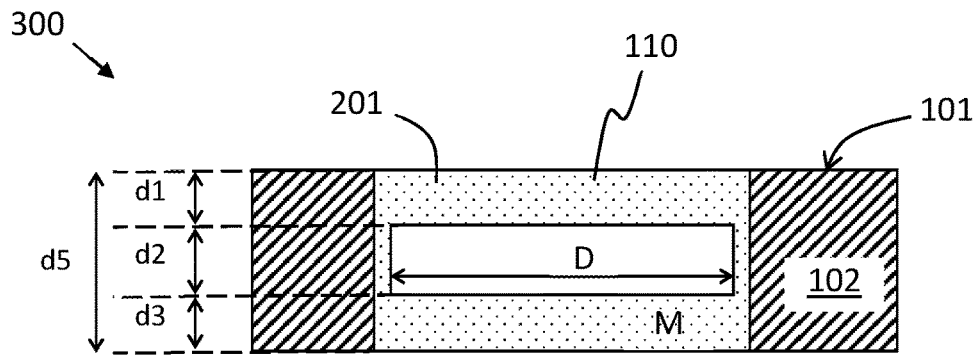

FIG. 3A shows the wireless identification tag 110 embedded in a volume 201 formed in an electrically conductive surface 101 of a rotatable work tool 102. The volume in FIG. 3A is defined by a milled recess in the work tool 102. As mentioned above, the volume 201 may either be a through hole, or a recess formed in the material of the work tool. FIG. 3B schematically shows such a though hole design option. The tag circuitry is preferably comprised on a piece of PCB, which is an example of a carrier member that can be assembled into a volume formed in the work tool 102. Optionally, the PCB may be lacquered to provide resistance against moisture which may build up in the enclosing material.

Figure 4A:
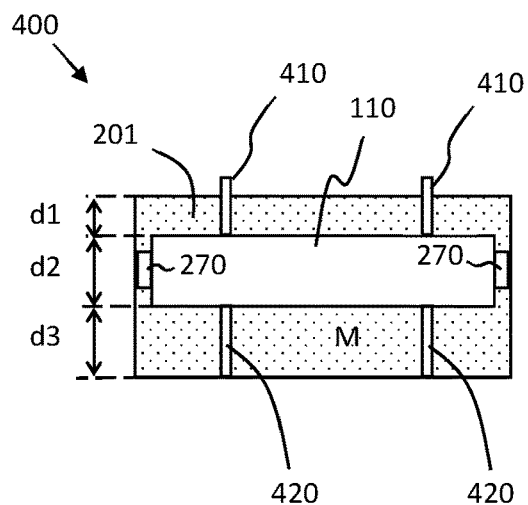
FIGS. 4A,B illustrate embedded wireless identification tags.
Figure 4B:
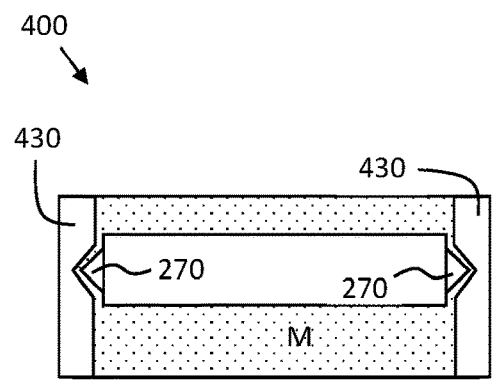

FIG. 3A, 3B, with reference also to FIG. 4A, 4B and FIG. 6, shows a wireless identification tag 300 for embedding into a surface 101 of a work tool 102. The wireless identification tag comprises processing circuitry 610 arranged on a carrier member for wireless communication with a corresponding reader 120, 150, 170. The carrier member is arranged embedded into an enclosing material M having a Shore A hardness between 40 and 100 able to withstand the blasting effect on the tag from the dust and slurry generated during concrete processing.

The wireless identification tags disclosed herein comprise a carrier member, such as a PCB, onto which processing circuitry and other components are mounted. The carrier member and the components are then enclosed by the enclosing material M.

The range of Shore A hardness values from 40-100 of the enclosing material have been found to effectively reduce mechanical wear due to the blasting effect from the dust and slurry which is generated during concrete processing. The enclosing material M is durable, and yet resilient instead of hard and brittle, which means that abrasive particles bounce off the enclosing material instead of wearing down the material. A more preferred range of Shore A hardness is between 70-100, i.e., a slightly harder material yet still resilient enough to not get worn down by the blasting effect generated by the concrete dust and slurry. A Shore A hardness of around 70 corresponds to that of, e.g., a tire thread, while a Shore A hardness of around 100 can be found in the wheels of, e.g., a shopping cart or some skateboards. Preferably, the enclosing material M comprises a chemically resistant material able to withstand submersion in a base of pH at least 12 for 60 minutes according to ISO 2812.

FIGS. 3A and 3B indicate some key dimensions of the wireless identification tag including the enclosing material M. The tag is preferably embedded at a depth d1 from the level of the surface 101. The overall thickness of the carrier member and the circuitry of the wireless identification tag is d2. The thickness of the wireless identification tag including the enclosing material M is d4. The following ranges of dimensions are suitable.

|    | Through hole (FIG. 3A) | | Recess (FIG. 3B) | |
| --- | --- | --- | --- | --- |
|    | min [mm] | max [mm] | min [mm] | max [mm] |
| d1 | 0.55 | 1 | 0.45 | 0.75 |
| d2 | 0.7 | 1.2 | 0.7 | 1.2 |
| d3 | 0.55 | 1 | 0.45 | 0.75 |
| d4 | 0 | 0 | 0.2 | 0.5 |
| d5 | 1.8 | 3.2 | 1.6 | 2.7 |

It is appreciated that the values in the above table may be selected freely within the defined ranges. Thus, the above values for d1-d5 define a four dimensional space of suitable values for the recess implementation and a three dimensional space for the through hole implementation, since d1+d2+d3=d4. A combination of dimension values can be freely selected within this space. Preferably, d1=d3, at least in the through hole implementation, but this is not strictly necessary. It is also appreciated that other objects can be embedded in the enclosing material, in which case the above dimensions may no longer apply.

The enclosing material M is optionally also an adhesive material arranged to form a bond between the wireless identification tag 110, 300, 400 and the work tool 102 to hold the wireless identification tag in position relative to the work tool 102. Thus, the wireless identification tag carrier member comprising, e.g., the RFID circuitry and power, can be embedded into the volume 201 and held in place by the adhesive effect from the enclosing material M.

Alternatively, the carrier member and the electric components can be molded into the enclosing material in a shape matched to the volume 201. The enclosed circuitry making up the wireless identification tag can then be inserted into the volume and held in place by, e.g., a secondary adhesive or by some form of fastening member, like a threaded member such as a bolt. Some form of snap-lock mechanism may also be used.

A suitable material for use as enclosing material M is polyurethane. Polyurethane (PUR, PU) is a polymer composed of organic units joined by carbamate (urethane) links. While most polyurethanes are thermosetting polymers that do not melt when heated, thermoplastic polyurethanes are also available. Polyurethane polymers are traditionally and most commonly formed by reacting a di- or triisocyanate with a polyol. Since polyurethanes contain two types of monomers, which polymerize one after the other, they are classed as alternating copolymers. Both the isocyanates and polyols used to make polyurethanes contain, on average, two or more functional groups per molecule. Polyurethanes are used in the manufacture of high-resilience foam seating, durable elastomeric wheels, and tires (such as roller coaster, escalator, shopping cart, elevator, and skateboard wheels), automotive suspension bushings, electrical potting compounds, high-performance adhesives, surface coatings and sealants.

The enclosing material M may also comprise rubber, such as natural rubber, NR, and/or Styrene-butadiene rubber, SBR. Such rubber materials are naturally resilient and able to withstand mechanical wear from the dust and the slurry. Rubbers and rubber compounds can also be designed to withstand strong bases, i.e., having pH values of around 12-13, which is often seen in concrete.

The enclosing material M may furthermore comprise a material which by itself is relatively hard and brittle, but which has been modified by addition of a softener such as ethylene propylene diene monomer (EPDM) rubber. This way hard and brittle materials such as different epoxies and polystyrene materials as well as thermoplastics such as Polyamide, Polypropylene or Acrylonitrile Butadiene Styrene (ABS) may also be used if properly modified by suitable additives.

Depending on the mechanical tolerances involved in the embedding of the tag, it may be desired to accurately position the carrier with respect to the walls of the volume 201. If the carrier member is tilted, a part of it may inadvertently stick out from the volume and extend past the surface 101, which means that the circuitry on the carrier member may be exposed to severe mechanical wear from the above-mentioned sand-blasting effect and also from exposure to mechanical shock. To position the carrier member more accurately in the enclosing material, one or more positioning elements 270, 410, 420 may be arranged extending out from the carrier member. Some example positioning members 270 were discussed above in connection to FIG. 2. These positioning members extend radially out from the carrier member to hold the carrier in position with respect to the side walls of the volume and may also form part of a snap-lock mechanism. FIG. 5 shows examples of further positioning members 410, 420. The positioning members 410 extend out from one side of the carrier member, while the positioning members 420 extend out from an opposite side of the carrier member. In case the carrier member is flat, i.e., extends in a plane, then the positioning members 410, 420 can be said to extend out from the carrier member in a direction normal to the plane. Thus, the carrier member can be held in fixed position as the enclosing material M hardens to lock the carrier member in position relative to the enclosing material M. As mentioned above, the positioning members 270, 410, 420 can be used both if the carrier member is molded into the enclosing material or if the enclosing material is used to fill up the space between the carrier member and the components and the walls of the volume 201 in the work tool 102.

In case the volume 201 is a recess, then the positioning elements 420 extending towards the bottom of the recess can be adapted in length to position the carrier member at a desired height d3 in the recess, as shown in FIG. 4A. The upper positioning members 410 will in most cases extend past the surface 101 after the enclosing material M has cured. These protruding portions can easily be removed by milling or the like, thus providing a flat surface after the embedding.

FIG. 4B illustrates another example of a positioning member 430. Here, a snap-lock mechanism 430, 270 holds the carrier member in position relative to the work tool 102. The carrier member is inserted into the volume, whereupon the snap-lock mechanism holds the carrier member in position. For instance, the thickness of the protruding portions 270 can be configured to allow for a snap-lock effect with respect to a groove formed in the inner wall of the recess in the work tool as shown in FIG. 4B.

An inner thread can also be formed in the work tool recess or through-hole. The carrier member can then be threaded into a locking position.

FIG. 5 is a flow chart illustrating methods as disclosed herein. There is illustrated a method for manufacturing a wireless identification tag 110, 300, 400. The method comprises obtaining S1 a carrier member with processing circuitry. This carrier member may, e.g., be a PCB. Optionally, the PCB may be lacquered to provide resistance against moisture which may build up in the enclosing material. The method also comprises configuring S2 one or more positioning elements 270, 410, 420 to extend out from the carrier member. The positioning elements may, e.g., extend radially outwards from a coin-shaped carrier member as in FIG. 2, or normal to either face of a flat carrier member, as illustrated in FIG. 4A and discussed above.

The method further comprises embedding S3 the wireless identification tag 110, 300, 400 comprising the carrier member and the one or more positioning elements 270, 410, 420 into a surface 101 of a work tool 102 and removing S4 any protruding parts of the positioning elements extending out from the surface 101.

FIG. 6 schematically illustrates, in terms of a number of functional units, the general components of a control unit 600 which may be arranged on the above-mentioned carrier member. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 may further be provided as at least one application specific integrated circuit ASIC, or field programmable gate array FPGA.

Particularly, the processing circuitry 610 is configured to cause the wireless identification tag 110 to perform a set of operations, or steps, such as the methods discussed in connection to FIG. 5 and the discussions above. For example, the storage medium 630 may store the set of operations, and the processing circuitry 610 may be configured to retrieve the set of operations from the storage medium 630 to cause the device to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The device 600 may further comprise an interface 620 for communications with at least one external device, e.g., via inductive communications link. As such the interface 620 may comprise one or more transmitters and receivers, comprising analogue and digital components and a suitable number of ports for wireline or wireless communication.

The processing circuitry 610 controls the general operation of the wireless identification tag 110, e.g., by sending data and control signals to the interface 620 and the storage medium 630, by receiving data and reports from the interface 620, and by retrieving data and instructions from the storage medium 630.

The invention claimed is:

1. A wireless identification tag for embedding into a surface of a concrete processing work tool, the wireless identification tag comprising processing circuitry arranged on a carrier member for wireless communication with a corresponding reader, wherein the carrier member is arranged at least partially embedded into an enclosing material having a Shore A hardness between 40 and 100, wherein one or more positioning elements are arranged extending out from the carrier member to position the carrier member in the enclosing material.

2. The wireless identification tag according to claim 1, wherein the Shore A hardness is between 70-100.

3. The wireless identification tag according to claim 1, wherein the enclosing material comprises a chemically resistant material able to withstand submersion in a base of pH at least 12 for 60 minutes according to ISO 2812.

4. The wireless identification tag according to claim 1, wherein the enclosing material is an adhesive material arranged to form a bond between the wireless identification tag and the concrete processing work tool to hold the wireless identification tag in position relative to the concrete processing work tool.

5. The wireless identification tag according to claim 1, wherein the enclosing material is polyurethane.

6. The wireless identification tag according to claim 1, wherein the enclosing material comprises rubber, natural rubber, NR, and/or Styrene-butadiene rubber, SBR.

7. The wireless identification tag according to claim 1, wherein the enclosing material comprises a softening additive such as ethylene propylene diene monomer, EPDM, rubber.

8. The wireless identification tag according to claim 1, wherein one or more positioning elements are arranged to form a snap-lock mechanism with a mating structure of a work tool.

9. The wireless identification tag according to claim 1, wherein one or more positioning elements are arranged to be threaded into a threaded portion formed in the work tool.

10. A concrete processing work tool comprising the wireless identification tag according to claim 1.

11. Concrete processing construction equipment comprising the wireless identification tag according to claim 1.

12. A method for manufacturing a wireless identification tag for embedding into a surface of a concrete processing work tool, the method comprising:
obtaining a carrier member comprising mounted processing circuitry,
configuring one or more positioning elements to extend out from the carrier member,
embedding the carrier member with the mounted processing circuitry and the one or more positioning elements into an enclosing material, and
removing any protruding parts of the positioning elements extending out from the enclosing material.

13. The method according to claim 12, wherein one or more positioning elements extend radially out from the coin-shaped carrier member.

14. The method according to claim 12, wherein one or more positioning elements extend along a normal vector to an extension plane of a flat carrier member.

15. The method according to claim 12, wherein the one or more positioning elements are matched to a volume in which the wireless identification tag is to be received.

16. The method according to claim 12, wherein the wireless identification tag is formed separately from the work tool by a mold of the enclosing material.

17. The method according to claim 12, wherein the wireless identification tag is formed integrally with the work tool by molding the enclosing material into a recess or through hole formed in the work tool.

* * * * *